United States Patent
Setterberg et al.

(10) Patent No.: US 12,344,073 B2
(45) Date of Patent: Jul. 1, 2025

(54) OBJECT TEMPERATURE REGULATOR SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Johan Setterberg, Gothenburg (SE); Erik Lindberg Nilsson, Gothenburg (SE)

(73) Assignees: Ningbo Geely Automobile & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 179 days.

(21) Appl. No.: 17/888,735

(22) Filed: Aug. 16, 2022

(65) Prior Publication Data

US 2022/0396122 A1    Dec. 15, 2022

Related U.S. Application Data

(63) Continuation of application No. PCT/CN2021/076851, filed on Feb. 19, 2021.

(30) Foreign Application Priority Data

Feb. 28, 2020   (EP) .................................... 20159996

(51) Int. Cl.
*B60H 1/00*    (2006.01)
*G05D 23/19*   (2006.01)
(Continued)

(52) U.S. Cl.
CPC ..... *B60H 1/00742* (2013.01); *G05D 23/1932* (2013.01); *G05D 23/27* (2013.01);
(Continued)

(58) Field of Classification Search
CPC .......... B60H 1/00742; G05D 23/1932; G05D 23/27; G06V 10/764; G06V 20/593; G06V 40/10
See application file for complete search history.

(56) References Cited

U.S. PATENT DOCUMENTS

| | | | |
|---|---|---|---|
| 6,021,956 A | 2/2000 | Haraguchi |
| 9,517,679 B2 | 12/2016 | Frank |
| 2003/0209893 A1 | 11/2003 | Breed |
| 2004/0025522 A1 | 2/2004 | Petesch |

(Continued)

FOREIGN PATENT DOCUMENTS

| | | |
|---|---|---|
| CN | 107415629 A | 12/2017 |
| CN | 107719065 A | 2/2018 |

(Continued)

OTHER PUBLICATIONS

International Search Report from International Application No. PCT/CN2021/076851, May 17, 2021, 2 pages.

(Continued)

*Primary Examiner* — Emmanuel E Duke
(74) *Attorney, Agent, or Firm* — Tucker Ellis LLP

(57) ABSTRACT

An object temperature regulator system for a vehicle for managing the temperature of a part of an object inside of the vehicle, the object temperature regulator system includes: at least one camera sensor; at least one object temperature regulator device configured to provide cooling and/or heating in a proximity to the object temperature regulator device; and a processing circuitry operatively connected to the camera sensor and the object temperature regulator device, the processing circuitry is configured to cause the object temperature regulator system to: detect a part of an object inside of the vehicle in image data obtained by the camera sensor; and control cooling or heating of the part of the detected object by the object temperature regulator device.

15 Claims, 5 Drawing Sheets

(51) Int. Cl.
*G05D 23/27* (2006.01)
*G06V 10/764* (2022.01)
*G06V 20/59* (2022.01)
*G06V 40/10* (2022.01)

(52) U.S. Cl.
CPC .......... *G06V 10/764* (2022.01); *G06V 20/593* (2022.01); *G06V 40/10* (2022.01)

(56) References Cited

U.S. PATENT DOCUMENTS

| | | |
|---|---|---|
| 2012/0276831 A1 | 11/2012 | Wang |
| 2016/0363340 A1 | 12/2016 | Shikii |
| 2018/0093547 A1* | 4/2018 | Perkins .............. B60H 1/00871 |
| 2019/0276032 A1 | 9/2019 | Fung |
| 2022/0072930 A1* | 3/2022 | Neveu ................ B60H 1/00742 |

FOREIGN PATENT DOCUMENTS

| | | | |
|---|---|---|---|
| CN | 108725136 A | 11/2018 | |
| CN | 109733155 A | 5/2019 | |
| CN | 110091692 A | 8/2019 | |
| DE | 112015004914 T5 | 7/2017 | |
| DE | 102017200909 A1 * | 7/2018 | |
| DE | 102018101504 A1 * | 7/2018 | ......... B60H 1/00021 |
| DE | 202019101874 U1 | 7/2019 | |
| EP | 0546429 B1 | 9/1995 | |
| JP | 2006327530 A * | 12/2006 | |

OTHER PUBLICATIONS

Fleck, Margaret et al., "Naked People Skin Filter", Sep. 19, 2019, 3 pages.

* cited by examiner

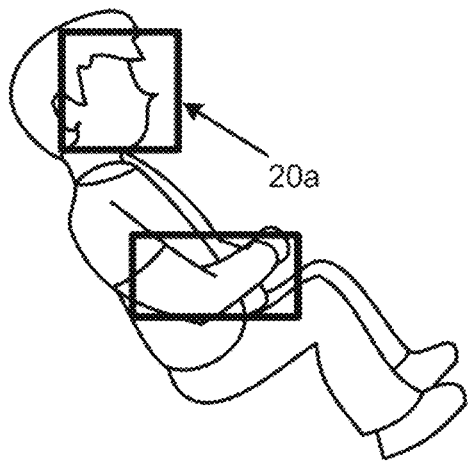
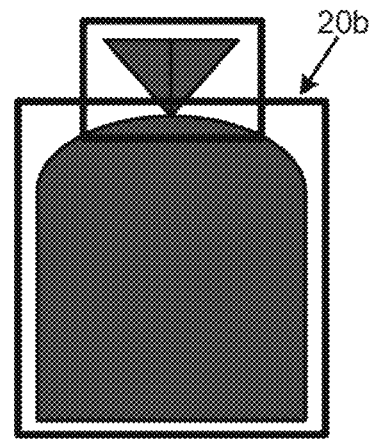
Fig. 3A　　　　　　　　　　　Fig. 3B
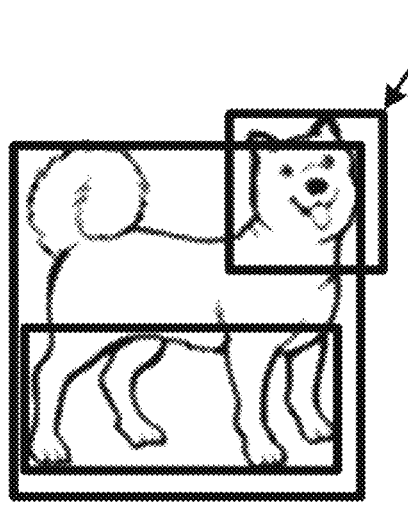
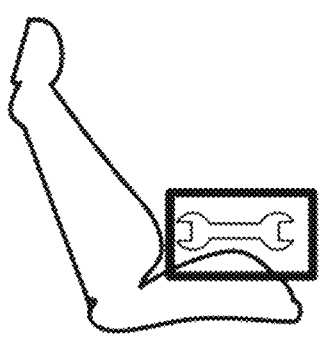
Fig. 3C　　　　　　　　　　　Fig. 3D
| Description | Set Temperature |
|---|---|
| Skin of human face | ST1=38 C |
| Skin of human arm | ST2=34 C |
| Grocery bag | ST3=8 C |
| Dog | ST4=31 C |
| Tool | ST5=N/A |
Fig. 4

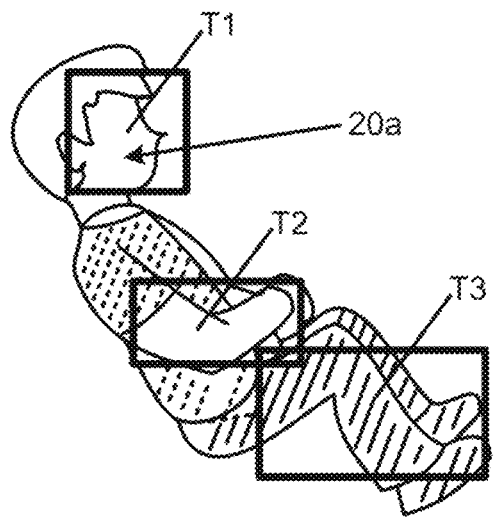
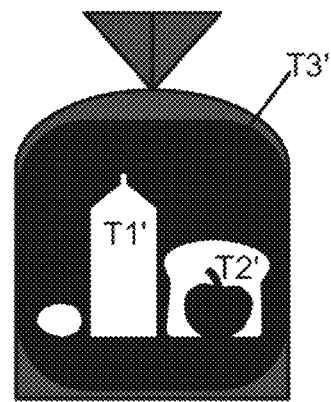
Fig. 5A　　　　　　　　　　Fig. 5B
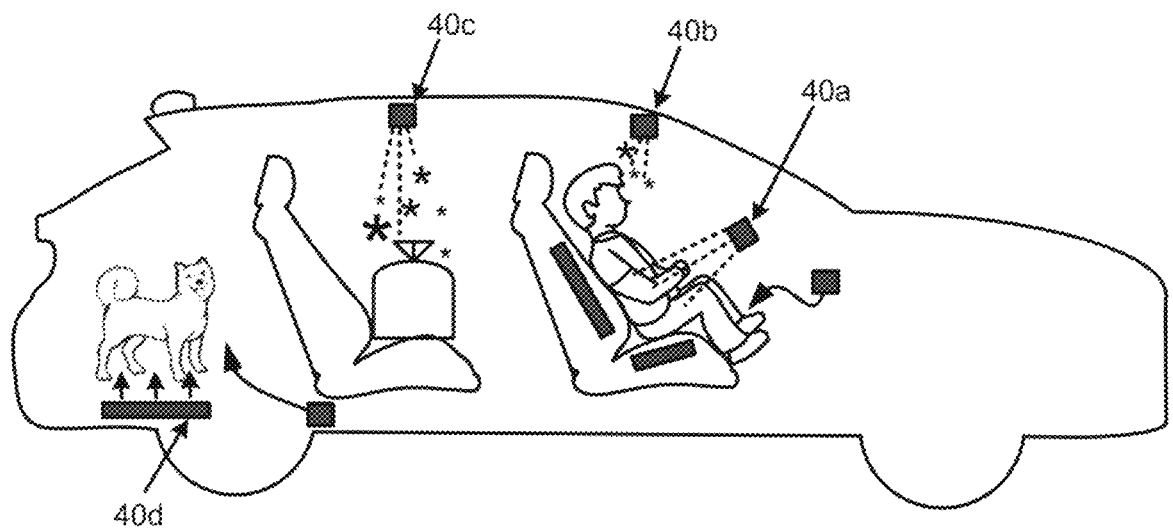
Fig. 6

OBJECT TEMPERATURE REGULATOR SYSTEM

RELATED APPLICATION DATA

This application is a continuation of International Patent Application No. PCT/CN2021/076851, filed Feb. 19, 2021, which claims the benefit of European Patent Application No. 20159996.6, filed Feb. 28, 2020, the disclosures of which are incorporated herein by reference in their entireties.

TECHNICAL FIELD

The present disclosure relates to an object temperature regulator system, a method and a computer program product for managing the temperature of an object inside of a vehicle. More specifically, the disclosure relates to an object temperature regulator system, a method and a computer program product for managing the temperature of a part of an object inside of a vehicle.

BACKGROUND

Most vehicles of today are equipped with some sort of climate regulation system, which functions to provide a comfortable air temperature within the whole vehicle compartment during its operation. The climate regulation system may e.g. provide either cool or hot air based on a target temperature, which have typically been set by either the vehicle driver or by an onboard passenger of the vehicle. Several fans distributed within the vehicle typically serve to distribute air streams in a plurality of areas within the vehicle to achieve an overall comfortable temperature of the whole vehicle compartment.

The energy spent on cooling or heating air to provide a comfortable air temperature within the whole vehicle compartment is a considerable amount of energy that cannot be ignored. Vehicle climate systems may traditionally draw heat from an internal combustion engine which provides excess heat, but while the excess heat is generally otherwise lost there is still a need to improve efficiency of climate systems for a general reduction of energy consumption of vehicles.

Electric vehicle generally do not constitute a similar source of excess heat, so while electric motor efficiency may be higher, climate system conditions may be more challenging and there is thus an analogue need for improved efficiency of climate systems for a general reduction of energy consumption of vehicles.

SUMMARY

A problem with climate regulation system of vehicles today is that there is a lot of energy spent on providing a comfortable air temperature within the whole vehicle compartment. Energy is sometimes wasted since a comfortable air temperature within the whole vehicle compartment is not always needed. In particular, in the example when only a driver is present in the vehicle there is no need to provide a comfortable air temperature in the backseat, or in other parts inside of the vehicle.

There are also occasions when it is not desired to have the same, or similar, air temperature within the whole vehicle compartment. In the example when an occupant has been shopping and puts the grocery bag in the backseat, there is even a desire that the groceries are not warmed up but instead that the temperature around the grocery bag is considerable lower compared to the desired temperature at the driver for example.

In general, there is a desire to minimize energy consumption by only cooling or heating when there is a need for it. For example, autonomous driving vehicles may be driving without any occupant onboard, and then there is no need to provide a comfortable temperature within the whole vehicle compartment.

The inventors have realized that there is a need for improved way to regulate the temperature of objects within a vehicle rather than to provide a comfortable air temperature within the whole vehicle compartment.

It is an object of the present disclosure to mitigate, alleviate or eliminate one or more of the above-identified deficiencies and disadvantages in the prior art and solve at least the above mentioned problem. E.g. one object of some embodiments is to improve energy efficiency. Yet another object of some embodiments is to improve the experience of vehicle occupants.

According to a first aspect there is provided an object temperature regulator system for a vehicle for managing the temperature of a part of an object inside of the vehicle, the object temperature regulator system comprises at least one camera sensor, at least one object temperature regulator device configured to provide cooling and/or heating in a proximity to the object temperature regulator device, and a processing circuitry operatively connected to the camera sensor and the object temperature regulator device, the processing circuitry is configured to cause the object temperature regulator system to detect a part of an object inside of the vehicle in image data obtained by the camera sensor, and control cooling or heating of the part of the detected object by the object temperature regulator device.

An advantage with this aspect is that the temperature of a part of an object can be controlled in close proximity to an object temperature regulator device. By controlling the temperature of the part of the object in close proximity to an object temperature regulator device, less or no energy spent on cooling or heating the air inside of the vehicle. Instead, only the part of the object is heated or cooled. Further, with a focus on controlling the temperature of the part of the object, by an object temperature regulator device in close proximity to the part of the object, less or no energy is spent on heating or cooling other objects inside of the vehicle.

According to some embodiments, the processing circuitry is further configured to cause the object temperature regulator system to identify the part of the detected object using object recognition processing of the obtained image data.

An advantage with this embodiment is that the part of the object can be identified in order to understand how to control cooling or heating of the part of the detected object.

According to some embodiments, the image data is obtained by a first camera sensor wherein the first camera sensor is configured to obtain a graphic image of the part of the detected object.

An advantage with this embodiment is that a graphic image of the part of the detected object can be used for controlling cooling or heating of the part of the detected object.

According to some embodiments, the image data is obtained by a second camera sensor wherein the second camera sensor is configured to obtain a thermographic image of the part of the detected object.

An advantage with this embodiment is that a thermographic image of the part of the detected object can be used for controlling cooling or heating of the part of the detected object.

According to some embodiments, the processing circuitry is further configured to cause the object temperature regulator system to classify the part of the detected object according to a predefined object category classification data, and determine a predefined desired set temperature of the part of the detected object based on the predefined object category classification data.

By classifying the part of the detected object according to a predefined object category classification data, an advantage is that a plurality of objects can be detected and identified, and from the predefined object category classification data a desired set temperature can be determined that can be used to control cooling or heating of the part of the detected object.

According to some embodiments, the processing circuitry is further configured to cause the object temperature regulator system to determine the temperature of the part of the detected object.

With knowledge of the temperature of the part of the detected object, an advantage is that cooling or heating of the part of the detected object can be controlled in a more precise and energy efficient way by only providing necessary cooling or heating of the part of the detected object.

According to some embodiments, the temperature of the part of the detected object is determined by a second camera sensor wherein the second camera sensor is configured to obtain a thermographic image of the part of the detected object for determining the temperature of the part of the detected object.

An advantage with this embodiment is that the thermographic image of the part of the detected object provides a dynamic and precise temperature data of the part of the detected object which enhances that the cooling or heating of the part of the detected object can be controlled in a more precise and energy efficient way by only providing necessary cooling or heating of the part of the detected object.

According to some embodiments, the processing circuitry is further configured to identify the part of the detected object using object recognition processing of a first image data obtained by a first camera sensor and using object recognition processing of a second image data obtained by a second camera sensor, wherein the first camera sensor is configured to obtain a graphic image of the part of the detected object and the second camera sensor is configured to obtain a thermographic image of the part of the detected object for identifying the same part of the detected object in both the first image data and in the second image data.

An advantage with this embodiment is that by using object recognition processing of both the graphic image and the thermographic image, the same part of the detected object can be detected and identified via by both the first and the second camera sensor, to provide information about what part of the object that has been detected, and what the temperature of the part of the object is.

According to some embodiments, the processing circuitry is further configured to cause the object temperature regulator system to determine the location of the part of the detected object in relation to the object temperature regulator device based on object recognition processing of the obtained image data and based on location data associated with the location of the object temperature regulator device and the location and/or orientation of the camera sensor.

With knowledge of the location of the part of the detected object, an advantage is that it can be determined which object temperature regulator device to use in order to control cooling or heating of the part of the detected object.

According to some embodiments, the object temperature regulator device remains inactive until a part of an object to be cooled or heated is identified for lowering energy consumption of the vehicle.

This embodiment has an advantage that the energy consumption can be minimized or eliminated if no part of an object is identified, since then there is no need to provide cooling or heating by the object temperature regulator device, which instead can remain inactive.

According to some embodiments, the processing circuitry is further configured to identify the part of the detected object as a part of a human body and determine if the part of the human body is covered by any garment or if the part of the human body is exposed naked skin, and in accordance with a determination that the part of the human body is exposed naked skin, determine the temperature of the skin of the part of the human body for controlling cooling or heating of the part of the human body.

An advantage with this embodiment is that with knowledge of that the part of the detected object is a part of a human body, and further with the knowledge of that the part of the human body is exposed naked skin, the temperature of the exposed naked skin of the human body can be measured, which enhances the cooling or heating of the part of the human body to be controlled in a more precise and energy efficient way by only providing necessary cooling or heating of the part of the human body.

According to a second aspect there is provided a method for managing the temperature of a part of an object inside of a vehicle, the method comprising detecting a part of an object inside of the vehicle in image data obtained by a camera sensor and controlling cooling or heating of the part of the detected object by an object temperature regulator device.

An advantage with the second aspect is that the temperature of a part of an object can be controlled in close proximity to an object temperature regulator device. By controlling the temperature of the part of the object in close proximity to an object temperature regulator device, less or no energy spent on cooling or heating the air inside of the vehicle to provide a comfortable air temperature within the whole vehicle compartment. Instead, only the part of the object is heated or cooled. Further, with a focus on controlling the temperature of the part of the object, by an object temperature regulator device in close proximity to the part of the object, less or no energy is spent on heating or cooling other objects inside of the vehicle.

According to some embodiments, the method further comprises identifying the part of the detected object using object recognition processing of the obtained image data.

An advantage with this embodiment is that the part of the object can be identified in order to understand how to control cooling or heating of the part of the detected object.

According to some embodiments, the method further comprises classifying the part of the detected object according to a predefined object category classification data, and determining a predefined desired set temperature of the part of the detected object based on the predefined object category classification data.

By classifying the part of the detected object according to a predefined object category classification data, an advantage is that a plurality of objects can be detected and identified, and from the predefined object category classification data a desired set temperature can be determined that can be used to control cooling or heating of the part of the detected object.

According to some embodiments, the method further comprises: determining the temperature of the part of the detected object.

With knowledge of the temperature of the part of the detected object, an advantage is that cooling or heating of the part of the detected object can be controlled in a more precise and energy efficient way by only providing necessary cooling or heating of the part of the detected object.

According to a third aspect there is provided a computer program product comprising a non-transitory computer readable medium, having thereon a computer program comprising program instructions, the computer program being loadable into a processing circuitry and configured to cause execution of the method when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIGS. 3A-3D illustrate example objects and example detected parts of objects according to an embodiment of the present disclosure.

FIG. 4 illustrates example predefined desired set temperatures of example parts of detected objects according to an embodiment of the present disclosure.

FIG. 5A-5B illustrate example temperatures of parts of detected objects according to an embodiment of the present disclosure.

FIG. 6 illustrates example cooling and heating of plural parts of detected objects by object temperature regulator devices according to an embodiment of the present disclosure.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
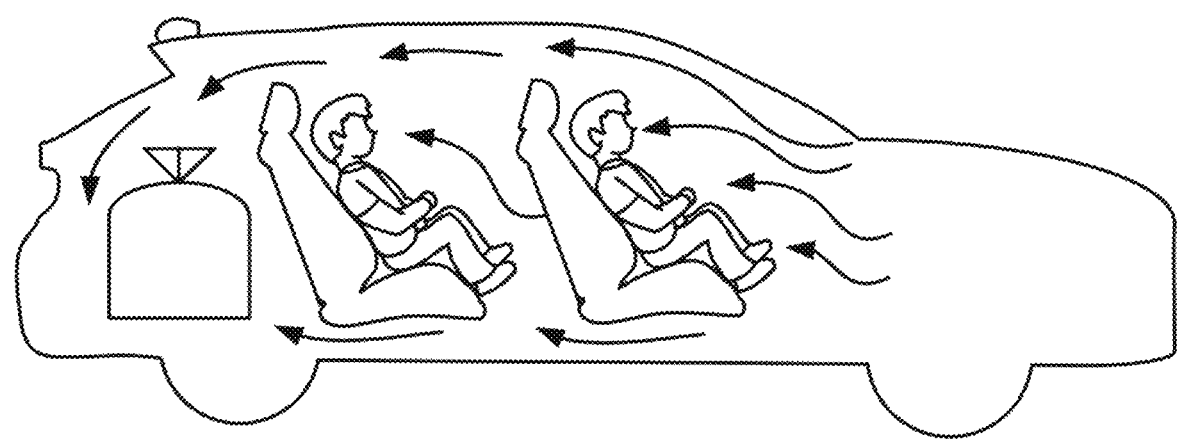
FIGS. 1A-1B illustrate example overviews of air streams of tempered air in a vehicle with a climate regulation system according to the prior art.
Figure 1B:
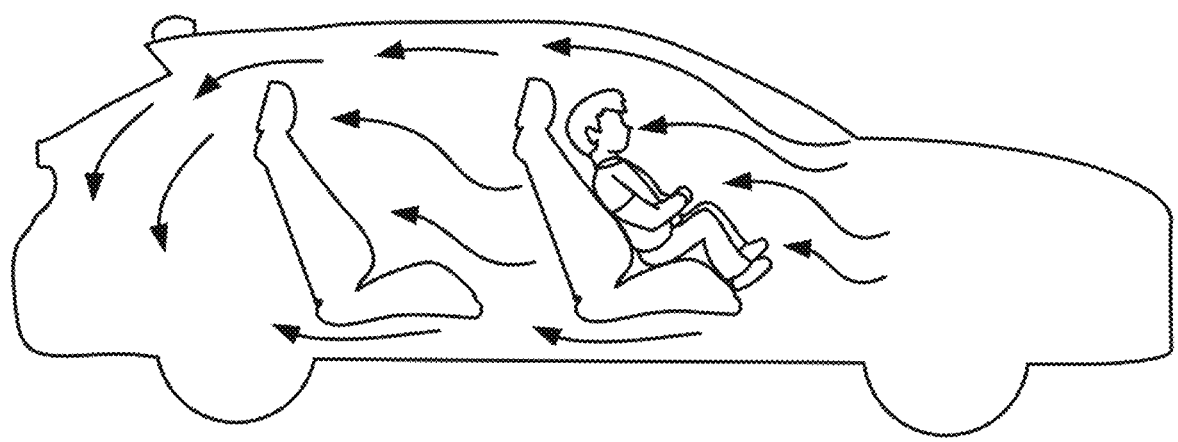

A problem with climate regulation system of vehicles today is that there is a lot of energy spent on providing a comfortable air temperature within the whole vehicle compartment. Several fans distributed within the vehicle typically serves to distribute air streams in a plurality of areas within the vehicle to achieve an overall comfortable temperature of the whole vehicle compartment. FIGS. 1A-1B illustrate example overviews of air streams of tempered air in a vehicle with a climate regulation system according to the prior art.

Energy is sometimes wasted since a comfortable air temperature within the whole vehicle compartment is not always needed, or desired.

In one example, as illustrated in FIG. 1A, a vehicle occupant has been shopping and has put the grocery bag with the cold groceries in the back of the vehicle. The tempered air inside of the vehicle warms up the air around the grocery bag in the back of the vehicle, which in turn warms up the groceries in the bag. In this case there is even a desire that the groceries are not warmed up but instead that the temperature around the grocery bag is considerable lower compared to the desired temperature at the driver for example. But, in this example the comfortable air temperature within the whole vehicle compartment is set to make the temperature of the vehicle compartment comfortable for all the vehicle occupants and the grocery bag is not taken into consideration.

In another example, as illustrated in FIG. 1B only a driver present in the vehicle. In this example there is no need to provide a comfortable air temperature in the backseat, or in other parts inside of the vehicle. Energy is hence wasted on warming up the air in the backseat and the air in the back of the vehicle in this example. The climate regulation system according to the prior art does not take into consideration that no other person is present in the vehicle and therefore spends excess energy on cooling or warming the air in the backseat and in other parts inside of the vehicle.

The inventors have realized that there is a desire to minimize energy consumption by only cooling or heating when and where there is a need for it. For example, autonomous driving vehicles may be driving without any occupant onboard, and then there is no need to provide a comfortable temperature within the whole vehicle compartment.

The inventors have also realized that there is a need for improved way to regulate the temperature of objects, and part of objects, within a vehicle rather than to provide a comfortable air temperature within the whole vehicle compartment. For example, it can be desired to keep a grocery bag at a cooler temperature than a vehicle occupant, but there can also be a desire to keep a part of an object at a certain temperature and another part of the object at a different temperature.

Figure 2A:
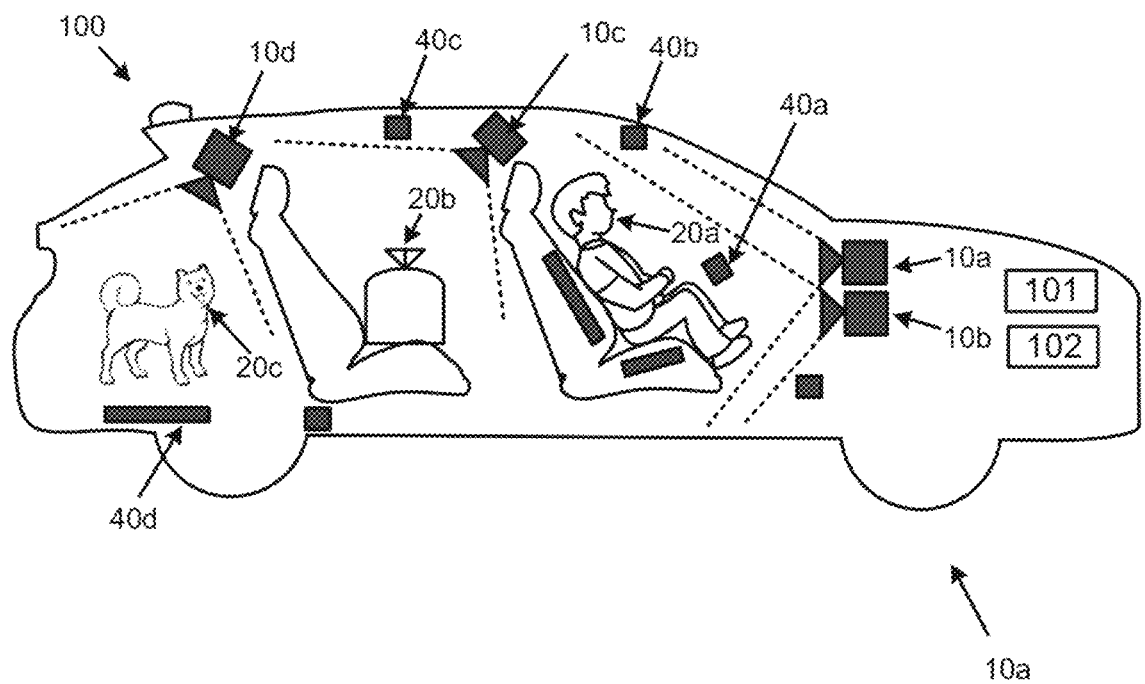
FIGS. 2A-2B illustrate example overviews of the temperature regulator system according to an embodiment of the present disclosure.
Figure 2B:
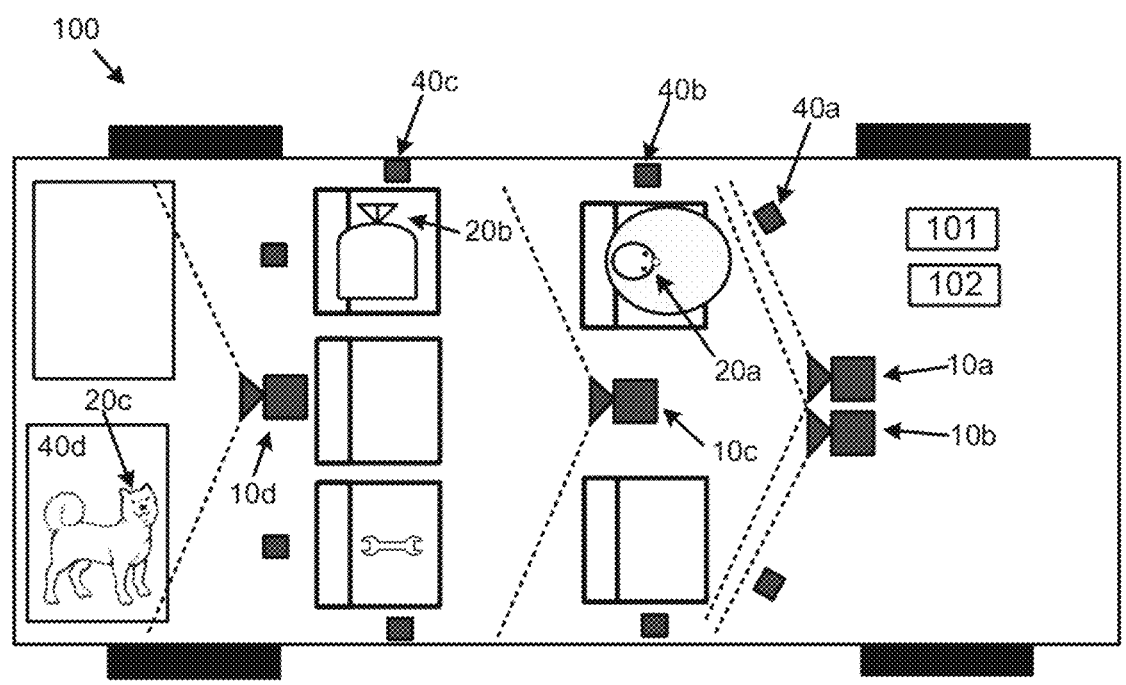

The first aspect of this disclosure shows an object temperature regulator system 100 for a vehicle 1 for managing the temperature of a part of an object 20a, 20b, 20c inside of the vehicle 1. FIGS. 2A-2B illustrate example overviews of the temperature regulator system 100 according to an embodiment of the present disclosure.

According to some embodiments the part of an object 20a, 20b, 20c can be any part of any object. According to some embodiments the object is a physical object inside of the vehicle 1. According to some embodiments the object is a physical object inside of the vehicle 1 that is not a part of the vehicle 1. According to some embodiments the object is any of a grocery bag, a cool pack, a food box, a pizza box, a sports bag, a tool, a machine.

According to some embodiments the object is a human. According to some embodiments the part of an object 20a, 20b, 20c is a part of a human. According to some embodiments the part of an object 20a, 20b, 20c is any of a hand, a foot, a face, a neck, an arm, a leg, a chest, an ear, a nose or a forehead of a human. According to some embodiments the part of an object 20a, 20b, 20c is skin of a human. According to some embodiments the object is an animal. According to some embodiments the part of an object 20a, 20b, 20c is a part of an animal.

The object temperature regulator system 100 comprises at least one camera sensor 10a, 10b, 10c, 10d, at least one object temperature regulator device 40a, 40b, 40c, 40d configured to provide cooling and/or heating in a proximity to the object temperature regulator device 40a, 40b, 40c, 40d, and a processing circuitry 102 operatively connected to the camera sensor 10a, 10b, 10c, 10d and the object temperature regulator device 40a, 40b, 40c, 40d, the processing circuitry 102 is configured to cause the object temperature regulator system 100 to detect a part of an object 20a, 20b, 20c inside of the vehicle 1 in image data obtained by the camera sensor 10a, 10b, 10c, 10d, and control cooling or heating of the part of the detected object 20a, 20b, 20c by the object temperature regulator device 40a, 40b, 40c, 40d.

According to some embodiments the object temperature regulator system 100 comprises a plurality of camera sensors 10a, 10b, 10c, 10d. In the illustrate example overviews in FIGS. 2A and 2B, camera sensors 10a, 10b, 10c, 10d are arranged inside of the vehicle 1 to obtain images of objects inside of the vehicle 1. In the illustrate example overviews in FIGS. 2A and 2B the camera sensors 10a and 10b are arranged to provide images of the front seats of the vehicle 1, camera sensor 10c is arranged to provide images of the back seat of the vehicle 1, and the camera sensor 10d is arranged to provide images of the trunk of the vehicle 1.

According to some embodiments the temperature regulator device 40a, 40b, 40c, 40d is any of an infrared heating device, an electric convection heating device, a chemical or electrical heating pad or an electric seat heating device. According to some embodiments the temperature regulator device 40a, 40b, 40c, 40d is an air ventilation outlet configured to output hot or cool air in the proximity of the temperature regulator device 40a, 40b, 40c, 40d. According to some embodiments the temperature regulator device 40a, 40b, 40c, 40d is a seat ventilation outlet configured to output hot or cool air in the proximity of the temperature regulator device 40a, 40b, 40c, 40d when arranged at a seat. According to some embodiments the object temperature regulator device 40a, 40b, 40c, 40d is a chemical cooling or heating device. In an example isobutene is used in a chemical temperature regulator device for cooling the part of the detected object 20a, 20b, 20c. According to some embodiments the temperature regulator device 40a, 40b, 40c, 40d is configured to provide cooling by artificial snow or ice. An example how to provide cooling by artificial snow or ice is disclosed in the European Patent Application with application number 19218485.1.

According to some embodiments the temperature regulator device 40a, 40b, 40c, 40d is arranged to be in the proximity of a part of a vehicle occupant when the vehicle occupant is seated in the vehicle 1 for controlling cooling or heating of the part of the vehicle occupant. According to some embodiments the temperature regulator device 40a, 40b, 40c, 40d is arranged to be in the proximity of a predefined area inside of the vehicle 1 for controlling cooling or heating a part of an object placed in the predefined area. According to some embodiments the temperature regulator device 40a, 40b, 40c, 40d is arranged to be in the proximity to the part of the object 20a, 20b, 20c for avoid cooling or heating the air surrounding the part of the object 20a, 20b, 20c. In the illustrate example overviews in FIGS. 2A and 2B the temperature regulator devices 40a, 40b, 40c, 40d are arranged in the vehicle 1 to be in the proximity of vehicle occupants, but also to be in the proximity to objects in the trunk for example. The illustrate example overviews in FIGS. 2A and 2B only discloses four temperature regulator devices 40a, 40b, 40c, 40d, however it is understood that if more temperature regulator devices are arranged inside of the vehicle 1, cooling and/or heating can be provided in a closer proximity to the part of the object 20a, 20b, 20c. In an example, a plurality of temperature regulator devices 40a, 40b, 40c, 40d can be arranged to provide cooling and/or heating of a plurality of different parts of a vehicle occupant, such as to provide cooling and/or heating at the feet, the chins, the haunch, the rear, the back, the chest, the hands, the forearm, the upper arm, the neck, the face etc.

An advantage with this aspect is that the temperature of a part of an object 20a, 20b, 20c can be controlled in close proximity to an object temperature regulator device 40a, 40b, 40c, 40d. By controlling the temperature of the part of the object 20a, 20b, 20c in close proximity to an object temperature regulator device 40a, 40b, 40c, 40d, less or no energy spent on cooling or heating the air inside of the vehicle 1. Instead, only the part of the object 20a, 20b, 20c is heated or cooled. Further, with a focus on controlling the temperature of the part of the object 20a, 20b, 20c, by an object temperature regulator device 40a, 40b, 40c, 40d in close proximity to the part of the object 20a, 20b, 20c, less or no energy is spent on heating or cooling other objects inside of the vehicle 1. This provides for example that a grocery bag in the backseat can be cooled down while a driver in the driver seat can be warmed up simultaneously.

According to some embodiments, the object temperature regulator system 100 comprises a first object temperature regulator device and a second object temperature regulator device wherein the first object temperature regulator device is controlled to cool a first part of an object and the second object temperature regulator device 40b is controlled to heat a second part of an object simultaneously. In an example, the first part of an object is a hot face that is determined to be cooled, and the second part of an object is a cold foot determined to be heated.

According to some embodiments the processing circuitry 102 is configured to cause the object temperature regulator system 100 to detect a part of an object 20a, 20b, 20c inside of the vehicle 1 in image data obtained by the camera sensor 10a, 10b, 10c, 10d. According to some embodiments the camera sensor 10a, 10b, 10c, 10d is any of a still image camera sensor or a video image camera sensor. According to some embodiment the image data obtained by the camera sensor 10a, 10b, 10c, 10d is stored in a memory 101.

According to some embodiments the processing circuitry 102 is further configured to cause the object temperature regulator system 100 to identify the part of the detected object 20a, 20b, 20c using object recognition processing of the obtained image data. According to some embodiments ordinary object detection computer technology related to computer vision and image processing that deals with detecting instances of semantic objects of a certain class such as humans or parts of humans, animals or part of animals, and objects or parts of objects in digital images and videos is used for identifying the part of the detected object 20a, 20b, 20c. FIGS. 3A-3D illustrate example objects and example detected parts of objects detected by object recognition processing of the obtained image data according to some embodiments of the present disclosure.

An advantage with this embodiment is that the part of the object can be identified in order to control cooling or heating of the part of the detected object.

According to some embodiments the processing circuitry 102 is further configured to identify the part of the detected object 20a, 20b, 20c as a part of a human body and determine if the part of the human body is covered by any garment or if the part of the human body is exposed naked skin, and in accordance with a determination that the part of the human body is exposed naked skin, determine the temperature of the skin of the part of the human body for controlling cooling or heating of the a part of the human body.

An advantage with this embodiment is that with knowledge of that the part of the detected object is a part of a human body, and further with the knowledge of that the part of the human body is exposed naked skin, the temperature of the exposed naked skin of the human body can be measured, which enhances the cooling or heating of the part of the human body to be controlled in a more precise and energy efficient way by only providing necessary cooling or heating of the part of the human body.

According to some embodiments the image data is obtained by a first camera sensor 10a wherein the first camera sensor 10a is configured to obtain a graphic image of the part of the detected object 20a, 20b, 20c. According to some embodiments the first camera sensor 10a is any of a Red Green Blue, RGB, camera sensor or a Black and White, B&W, camera sensor. According to some embodiments the first camera sensor 10a is any of charge-coupled device, CCD, camera sensor or an Complementary metal-oxide-semiconductor CMOS, camera sensor.

An advantage with this embodiment is that a graphic image of the part of the detected object can be used for controlling cooling or heating of the part of the detected object.

According to some embodiments, the image data is obtained by a second camera sensor wherein the second camera sensor is configured to obtain a thermographic image of the part of the detected object.

An advantage with this embodiment is that a thermographic image of the part of the detected object can be used for controlling cooling or heating of the part of the detected object.

According to some embodiments the second camera sensor 10b is any of a thermographic camera sensor, an infrared camera sensor or a thermal imaging camera sensor or a thermal imager camera sensor or any device that creates an image using infrared radiation.

According to some embodiments the processing circuitry 102 is further configured to cause the object temperature regulator system 100 to classify the part of the detected object 20a, 20b, 20c according to a predefined object category classification data, and determine a predefined desired set temperature ST1, ST2, ST3 of the part of the detected object 20a, 20b, 20c based on the predefined object category classification data.

By classifying the part of the detected object according to a predefined object category classification data, an advantage is that a plurality of objects can be detected and identified, and from the predefined object category classification data a desired set temperature can be determined that can be used to control cooling or heating of the part of the detected object.

According to some embodiments the processing circuitry 102 is further configured to obtain the ambient temperature surrounding the vehicle 1. According to some embodiments the ambient temperature surrounding the vehicle 1 is obtained by an ambient temperature sensor installed in the vehicle 1. According to some embodiments the ambient temperature surrounding the vehicle 1 is used for controlling cooling or heating of the part of the detected object 20a, 20b, 20c by the object temperature regulator device 40a, 40b, 40c, 40d. In an example if it is a cold winter day, and the ambient temperature surrounding the vehicle 1 is below zero degrees centigrade, the processing circuitry 102 is configured to control heating of the part of the detected object 20a, 20b, 20c by the object temperature regulator device 40a, 40b, 40c, 40d to a predefined desired set temperature ST1, ST2, ST3. In an example if it is a warm summer day, and the ambient temperature surrounding the vehicle 1 is over 30 degrees centigrade, the processing circuitry 102 is configured to control cooling of the part of the detected object 20a, 20b, 20c by the object temperature regulator device 40a, 40b, 40c, 40d to a predefined desired set temperature ST1, ST2, ST3.

FIG. 4 illustrates example predefined desired set temperatures of example parts of detected objects according to an embodiment of the present disclosure. In an example, a part of an object 20a is detected, e.g. as illustrated in FIG. 3A, and by using object recognition processing of the obtained image, the part of the object 20a is identified as the skin of a human face. By classifying the part of the detected object according to a predefined object category classification data, an advantage is that with e.g. the classification "skin of a human face" and using the predefined object category classification data, it can be determined that "skin of a human face" has a predefined desired set temperature that is 38 degrees centigrade. This set temperature that can then be used by the object temperature regulator system 100 to control cooling or heating of the "skin of a human face". A further advantage with this embodiment is hence that in order to control cooling or heating of the part of the detected object, in this example the "skin of a human face", there is no need to measure the actual temperature of the detected part of the object. Instead, in an example the ambient temperature surrounding the vehicle 1 can be used to control cooling or heating of the part of the detected object.

In further examples, as illustrated in FIG. 4, using the predefined object category classification data, it can be determined that "skin of human face" has a predefined desired set temperature that is 38 degrees centigrade, "grocery bag" has a predefined desired set temperature that is 8 degrees centigrade, "skin of human arm" has a predefined desired set temperature that is 34 degrees centigrade, "dog" has a predefined desired set temperature that is 31 degrees centigrade, and that "tool" has no predefined desired set temperature.

According to some embodiments, if it is determined that the part of the detected object 20*a*, 20*b*, 20*c* has no predefined desired set temperature, the object temperature regulator system 100 will not cool or heat of the part of the detected object 20*a*, 20*b*, 20*c*. In the example illustration in FIG. 3D, a tool is detected in the backseat. Since the tool has no predefined desired set temperature the object temperature regulator system 100 will not control cooling or heating of the tool.

According to some embodiments, the object temperature regulator system 100 is configured to only control cooling or heating of the part of the detected object 20*a*, 20*b*, 20*c* if the part of the detected object 20*a*, 20*b*, 20*c* is identified. According to some embodiments, the object temperature regulator system 100 is configured to only control cooling or heating of the part of the detected object 20*a*, 20*b*, 20*c* if the part of the detected object 20*a*, 20*b*, 20*c* is identified as a part of an object 20*a*, 20*b*, 20*c* to be managed by the object temperature regulator system 100.

An advantage with this aspect is that the object temperature regulator system 100 will not spend energy on cooling or heating parts of objects that are not determined to be managed by the object temperature regulator system 100.

In an example, the object temperature regulator system 100 can begin cooling or heating of the part of the detected object 20*a*, 20*b*, 20*c* by the object temperature regulator device 40*a*, 40*b*, 40*c*, 40*d*, using the predefined desired set temperature ST1, ST2, ST3 as a starting value. It is understood that the predefined desired set temperature ST1, ST2, ST3 can be values set at manufacturing of the vehicle, based on predetermined values, but the predefined desired set temperature ST1, ST2, ST3 could also be manipulated and adjusted by the vehicle occupant of the vehicle to fine tune the predefined desired set temperature ST1, ST2, ST3.

According to some embodiments the processing circuitry 102 is further configured to cause the object temperature regulator system 100 to determine the temperature T1, T2, T3 of the part of the detected object 20*a*, 20*b*, 20*c*. According to some embodiments the processing circuitry 102 is further configured to cause the object temperature regulator system 100 to determine the surface temperature T1, T2, T3 of the surface of the part of the detected object 20*a*, 20*b*, 20*c*. With knowledge of the temperature of the part of the detected object, an advantage is that cooling or heating of the part of the detected object can be controlled in a more precise and energy efficient way by only providing necessary cooling or heating of the part of the detected object.

According to some embodiments the object temperature regulator system 100 further comprises a temperature sensor configured to obtain the temperature T1, T2, T3 of the part of the detected object 20*a*, 20*b*, 20*c*. According to some embodiments the temperature sensor is an infrared thermometer configured to obtain the temperature T1, T2, T3 of the part of the detected object 20*a*, 20*b*, 20*c*. According to some embodiments the object temperature regulator system 100 comprises a plurality of temperature sensors arranged to obtain the temperature T1, T2, T3 of plural parts of the detected object 20*a*, 20*b*, 20*c*.

According to some embodiments the temperature sensor is arranged to be in the proximity of a part of a vehicle occupant when the vehicle occupant is seated in the vehicle 1 to obtain the temperature T1, T2, T3 of the part of the vehicle occupant that is in the proximity of the temperature sensor. According to some embodiments the temperature sensor is arranged to be in the proximity of a predefined area inside of the vehicle 1 to obtain the temperature T1, T2, T3 of the part of the object placed in the predefined area in the proximity of the temperature sensor.

According to some embodiments the processing circuitry 102 is further configured to cause the object temperature regulator system 100 to display, via a user interface, at least a first object information data indicative of the part of the detected object 20*a*, 20*b*, 20*c*. In an example the first object information data is "skin of human face". According to some embodiments the processing circuitry 102 is further configured to cause the object temperature regulator system 100 to display, via the user interface, at least a first temperature information data indicative of a temperature of the part the detected object 20*a*, 20*b*, 20*c*. In an example "33 C". According to some embodiments the processing circuitry 102 is further configured to cause the object temperature regulator system 100 to display, via the user interface, at least a first set temperature data indicative of a desired set temperature ST1, ST2, ST3 of the part of an object 20*a*, 20*b*, 20*c*. In an example "skin of human face ST 38 C". According to some embodiments the user interface displays a normalized temperature that is correlated to the temperature of the part the detected object 20*a*, 20*b*, 20*c* or the desired set temperature ST1, ST2, ST3 for ease of use purpose. In an example the desired set temperature of a human face is 38 C but the normalized temperature that is displayed via the user interface is e.g. 21 C to make it more understandable for the user that is used to an air climate temperature. According to some embodiments the processing circuitry 102 is further configured to receive, via the user interface, input of an updated desired set temperature ST1, ST2, ST3 of the part of the detected object 20*a*, 20*b*, 20*c*, and update the predefined desired set temperature ST1, ST2, ST3 of the part of the detected object 20*a*, 20*b*, 20*c* accordingly. According to some embodiments the processing circuitry 102 is further configured to receive, via the user interface, input of an updated normalized temperature that is correlated to the desired set temperature ST1, ST2, ST3 of the part of the detected object 20*a*, 20*b*, 20*c*, and update the predefined desired set temperature ST1, ST2, ST3 of the part of the detected object 20*a*, 20*b*, 20*c* accordingly.

According to some embodiments the temperature T1, T2, T3 of the part of the detected object 20*a*, 20*b*, 20*c* is determined by a second camera sensor 10*b* wherein the second camera sensor 10*b* is configured to obtain a thermographic image of the part of the detected object 20*a*, 20*b*, 20*c* for determining the temperature T1, T2, T3 of the part of the detected object 20*a*, 20*b*, 20*c*.

FIG. 5A-5B illustrate example temperatures of parts of detected objects according to an embodiment of the present disclosure. In the example as illustrated in FIG. 5A a thermographic image of a human results in that the temperature of the part of the detected object 20*a*, "skin of human face", is determined to be T1 degrees centigrade, e.g. 33 C. The temperature of the part of the detected object 20*b*, "skin of human arm", is determined to be T2 degrees centigrade, e.g. 29 C. The temperature of the part of the detected object 20c, "legs of human body covered by garment", is determined to be T3 degrees centigrade, e.g. 28 C.

In the example as illustrated in FIG. 5B a thermographic image of a grocery bag is obtained. The thermographic image of the grocery bag results that the grocery bag contains different parts with different temperatures e.g. a juice container that is T1' degrees centigrade, e.g. 8 C, frozen bread that is T2' degrees centigrade, e.g. 2 C, and the air in the top of the grocery bag is T3' degrees centigrade, e.g. 12 C.

An advantage with this embodiment is that the thermographic image of the part of the detected object 20a, 20b, 20c provides a dynamic and precise temperature data of the part of the detected object 20a, 20b, 20c which enhances that the cooling or heating of the part of the detected object 20a, 20b, 20c can be controlled in a more precise and energy efficient way by only providing necessary cooling or heating of the part of the detected object 20a, 20b, 20c.

According to some embodiments the processing circuitry 102 is further configured to identify the part of the detected object 20a, 20b, 20c using object recognition processing of a first image data obtained by a first camera sensor 10a and using object recognition processing of a second image data obtained by a second camera sensor 10b, wherein the first camera sensor 10a is configured to obtain a graphic image of the part of the detected object 20a, 20b, 20c and the second camera sensor 10b is configured to obtain a thermographic image of the part of the detected object 20a, 20b, 20c for identifying the same part of the detected object 20a, 20b, 20c in both the first image data and in the second image data.

In an example, as illustrated in FIGS. 2A and 2B, a first camera sensor 10a is arranged together with a second camera sensor 10b inside of the vehicle 1. In the example the first camera sensor 10a is arranged to obtain graphical image data and the second camera sensor 10b is arranged to obtain thermographic image data. Further, in the example illustration, a third camera sensor 10c is arranged to obtain graphical image data. In the example the first camera sensor 10a and the third camera sensor 10c obtains graphical image data of different parts of the vehicle compartment, the front seats and the back seat respectively. In the example the first camera sensor 10a obtains image data with focus on the driver, and parts of a grocery bag in the backseat is also obtained, while the third camera sensor 10c obtains image data of the backseat with focus on the grocery bag. In the example the second camera sensor 10b is arranged to obtain thermographic image data of both the driver in the front seat and the grocery bag in the backseat. By using object recognition processing of the first image data obtained by a first camera sensor 10a and using object recognition processing of the second image data obtained by a second camera sensor 10b, and using object recognition processing of the third image data obtained by a third camera sensor 10c, the thermographic image data from the second camera sensor 10b can be used together with the graphical image data from the first camera sensor 10a and the graphical image data from the third camera sensor 10c to determine both the temperature of the part of the detected object 20a, e.g. the temperature of the face of the driver, and the temperature of the part of the detected object 20b, e.g. the temperature of the content of the grocery bag.

According to some embodiments the camera sensor 10a, 10b, 10c is configured to obtain both a graphic image and a thermographic image and combine the graphic image and the thermographic image into one image data.

An advantage with this embodiment is that by using object recognition processing of both the graphic image and the thermographic image, the same part of the detected object 20a, 20b, 20c can be detected and identified via by both the first and the second camera sensor, to provide information about what part of the object 20a, 20b, 20c that has been detected, and the temperature of the part of the detected object 20a, 20b, 20c. In an example object recognition processing of the obtained image data is more precise when processing image data from a graphic image compare to when processing image data from a thermographic image. In an example, a thermographic image can be unclear if the temperature of plural objects are the same. For example if a seat is 10 C and a bag that is placed at the seat has the same temperature as the seat, 10 C, it can be difficult to detect the bag at the seat in the thermographic image, but in the graphic image the bag is easy to detect. In another example, when a person that has been working out and is warm gets into a warm vehicle a hot summer day it can be difficult to detect the warm person at the warm seat in the thermographic image, but in the graphic image the warm person is easy to detect.

According to some embodiments the processing circuitry 102 is further configured to cause the object temperature regulator system 100 to determine the location of the part of the detected object 20a, 20b, 20c in relation to the object temperature regulator device 40a, 40b, 40c, 40d based on object recognition processing of the obtained image data and based on location data associated with the location of the object temperature regulator device 40a, 40b, 40c, 40d and the location and/or orientation of the camera sensor 10a, 10b, 10c, 10d.

According to some embodiments the camera sensor 10a, 10b, 10c, 10d is arranged at a predetermined location with a predetermined orientation in order to determine the location of a part of an object 20a, 20b, 20c in proximity of an object temperature regulator device 40a, 40b, 40c, 40d. In an example the camera sensor 10a, 10b, 10c, 10d is arranged at a predetermined location with a predetermined orientation when manufacturing the vehicle 1. According to some embodiments the camera sensor 10a, 10b, 10c, 10d is arranged at a predetermined location with a predetermined orientation and an object temperature regulator device 40a, 40b, 40c, 40d is associated with the camera sensor 10a, 10b, 10c, 10d. In an example, when a camera sensor 10a, 10b, 10c, 10d detects a part of an object 20a, 20b, 20c, it is determined that the part of the detected object is in the proximity of a certain object temperature regulator device 40a, 40b, 40c, 40d.

According to some embodiments the image data obtained by the camera sensor 10a, 10b, 10c, 10d comprises a grid, wherein the grid is used to determine when a part of an object 20a, 20b, 20c is in the proximity of a certain object temperature regulator device 40a, 40b, 40c, 40d associated with the grid.

With knowledge of the location of the part of the detected object 20a, 20b, 20c, an advantage is that it can be determined which object temperature regulator device 40a, 40b, 40c, 40d to use in order to control cooling or heating of the part of the detected object 20a, 20b, 20c.

The inventors have realized that there is a need for improved way to regulate the temperature of objects within a vehicle rather than to provide a comfortable air temperature within the whole vehicle compartment.

According to some embodiments the object temperature regulator device 40a, 40b, 40c, 40d remains inactive until a part of an object 20a, 20b, 20c to be cooled or heated is identified for lowering energy consumption of the vehicle 1.

This embodiment has an advantage that the energy consumption can be minimized or eliminated if no part of an object is identified, since then there is no need to provide cooling or heating by the object temperature regulator device, which instead can remain inactive.

According to some embodiments, the object temperature regulator system 100 is configured to control cooling or heating of the part of the detected object 20a, 20b, 20c in accordance with a detection of the part of the object 20a, 20b, 20c inside of the vehicle 1. An advantage with this aspect is that if part of the object 20a, 20b, 20c is detected the object temperature regulator system 100 consumes a minimum or no energy for cooling or heating.

In the example illustration of the object temperature regulator system 100 in FIG. 2A, the object temperature regulator system 100 detects different parts of different objects inside of the vehicle 1. In the example in FIG. 2A, skin of human face 20a is detected in the area of the driver seat, and cold items in a grocery bag 20b is detected at the left backseat, and a head of a dog 20c is detected in the back of the vehicle 1. The illustration of FIG. 2B gives a better understanding of that there is a lot of space around the driver, the grocery bag and the dog where there no other object detected. In this example, it is determined that the face of the driver is to be cooled, however it is also determined that the arms of the driver are below a predefined desired set temperature and should be heated. The grocery bag in the backseat should be cooled down, and be held at 8 C. Further, the predefined desired set temperature for the dog is 31 C.

In this example, and as illustrated in the FIG. 6, the object temperature regulator system 100 controls heating of the arms of the driver by the object temperature regulator device 40a that is in this example an infrared heating device.

Further, in this example, and as illustrated in the FIG. 6, the object temperature regulator system 100 controls cooling of the skin of the face of the driver by the object temperature regulator device 40b that is in this example an artificial snow outlet.

Further, in this example, and as illustrated in the FIG. 6, the object temperature regulator system 100 controls cooling of the grocery bag in the backseat by the object temperature regulator device 40c that is in this example an artificial snow outlet.

Further, in this example, and as illustrated in the FIG. 6, the object temperature regulator system 100 controls heating of the dog in the back by the object temperature regulator device 40d that is in this example an electrical heating pad.

By only controlling cooling or heating of a part of a detected object 20a, 20b, 20c by the object temperature regulator device 40a, 40b, 40c, 40d no, or minimal, energy is spent on cooling or heating the air inside of the vehicle 1, but instead energy is only spent on cooling or heating parts of detected objects. In the example when the object temperature regulator device 40a, 40b, 40c, 40d is an air ventilation outlet configured to output hot or cool air in the proximity of the temperature regulator device 40a, 40b, 40c, 40d, there will likely be a slight cooling or heating of the air in the close proximity to the temperature regulator device 40a, 40b, 40c, 40d that cannot be avoided, but the intention is not to control the temperature of the air but to control the part of the detected object 20a, 20b, 20c that is in the proximity of the temperature regulator device 40a, 40b, 40c, 40d.

According to some embodiments the object temperature regulator system 100 is configured to cease cooling or heating in accordance with that a part of an object 20a, 20b, 20c is not detected inside of the vehicle 1.

According to some embodiments the processing circuitry 102 is configured to continuously verify that the part of the detected object 20a, 20b, 20c is detected inside of the vehicle 1 in image data obtained by the camera sensor 10a, 10b, 10c and control cooling or heating of the part of the detected object 20a, 20b, 20c when the part of the detected object 20a, 20b, 20c is detected inside of the vehicle 1.

Figure 7:
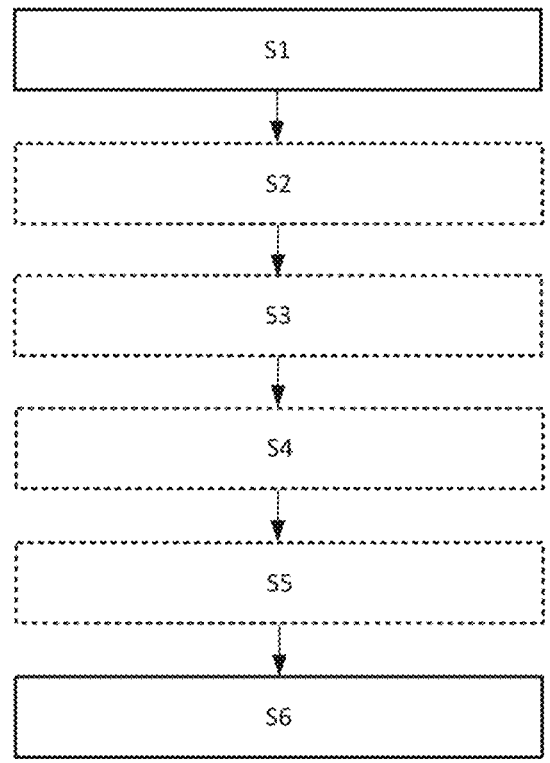
FIG. 7 illustrates a flow chart of the method steps according to the second aspect of the disclosure.

The second aspect of this disclosure shows a method for managing the temperature of a part of an object 20a, 20b, 20c inside of a vehicle 1. FIG. 7 illustrates a flow chart of the method steps according to the second aspect of the disclosure. The method comprising the step S1 detecting a part of an object 20a, 20b, 20c inside of the vehicle 1 in image data obtained by a camera sensor 10a, 10b, 10c, 10d, and the step S6 controlling cooling or heating of the part of the detected object 20a, 20b, 20c by an object temperature regulator device 40a, 40b, 40c, 40d.

An advantage with the second aspect is that the temperature of a part of an object can be controlled in close proximity to an object temperature regulator device. By controlling the temperature of the part of the object in close proximity to an object temperature regulator device, less or no energy spent on cooling or heating the air inside of the vehicle to provide a comfortable air temperature within the whole vehicle compartment. Instead, only the part of the object is heated or cooled. Further, with a focus on controlling the temperature of the part of the object, by an object temperature regulator device in close proximity to the part of the object, less or no energy is spent on heating or cooling other objects inside of the vehicle.

According to some embodiments the method further comprises the step S2 identifying the part of the detected object 20a, 20b, 20c using object recognition processing of the obtained image data.

An advantage with this embodiment is that the part of the object can be identified in order to understand how to control cooling or heating of the part of the detected object.

According to some embodiments the method further comprises the step S3 classifying the part of the detected object 20a, 20b, 20c according to a predefined object category classification data, and the step S4 determining a predefined desired set temperature ST1, ST2, ST3 of the part of the detected object 20a, 20b, 20c based on the predefined object category classification data.

By classifying the part of the detected object according to a predefined object category classification data, an advantage is that a plurality of objects can be detected and identified, and from the predefined object category classification data a desired set temperature can be determined that can be used to control cooling or heating of the part of the detected object.

According to some embodiments the method further comprises the step S5 determining the temperature T1, T2, T3 of the part of the detected object 20a, 20b, 20c.

With knowledge of the temperature of the part of the detected object, an advantage is that cooling or heating of the part of the detected object can be controlled in a more precise and energy efficient way by only providing necessary cooling or heating of the part of the detected object.

Figure 8:
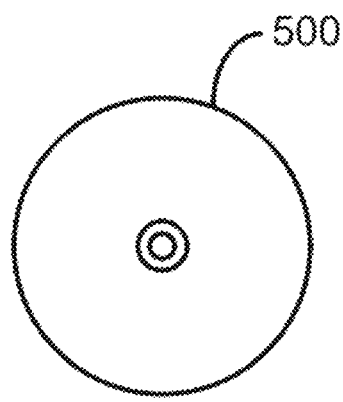
FIG. 8 illustrates a computer program product according to the third aspect of the disclosure.

The third aspect of this disclosure shows a computer program comprising a non-transitory computer readable medium, having thereon a computer program comprising program instructions, the computer program being loadable into a processing circuitry 102 and configured to cause execution of the method when the computer program is run by the at least one processing circuitry 102. FIG. 8 illustrates a computer program product according to the third aspect of the disclosure.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claims, from a study of the drawings, the disclosure, and the appended claims.

What is claimed is:

1. An object temperature regulator system for a vehicle for managing the temperature of a part of an object inside of the vehicle, the object temperature regulator system comprises:
    at least one camera sensor configured to obtain a graphic image of the part of the object and to obtain a thermographic image of the part of the object for determining a temperature of the part of the object;
    at least one object temperature regulator device configured to provide cooling and/or heating in a proximity to the object temperature regulator device; and
    a processing circuitry operatively connected to the camera sensor and the object temperature regulator device, the processing circuitry is configured to cause the object temperature regulator system to:
        detect a part of an object inside of the vehicle in image data obtained by the camera sensor; and
        control cooling or heating of the part of the detected object by the object temperature regulator device.

2. The object temperature regulator system according to claim 1, wherein the processing circuitry is further configured to cause the object temperature regulator system to:
    identify the part of the detected object using object recognition processing of the obtained image data.

3. The object temperature regulator system according to claim 2, wherein the image data is obtained by a first camera sensor wherein the first camera sensor is configured to obtain a graphic image of the part of the detected object.

4. The object temperature regulator system according to claim 1, wherein the processing circuitry is further configured to cause the object temperature regulator system to:
    classify the part of the detected object according to a predefined object category classification data; and
    determine a predefined desired set temperature of the part of the detected object based on the predefined object category classification data.

5. The object temperature regulator system according to claim 1, wherein the processing circuitry is further configured to cause the object temperature regulator system to:
    determine the temperature of the part of the detected object.

6. The object temperature regulator system according to claim 5 wherein the temperature of the part of the detected object is determined by a second camera sensor wherein the second camera sensor is configured to obtain a thermographic image of the part of the detected object for determining the temperature of the part of the detected object.

7. The object temperature regulator system according to claim 1, wherein the processing circuitry is further configured to identify the part of the detected object using object recognition processing of a first image data obtained by a first camera sensor and using object recognition processing of a second image data obtained by a second camera sensor, wherein the first camera sensor is configured to obtain the graphic image of the part of the detected object and the second camera sensor is configured to obtain the thermographic image of the part of the detected object for identifying the same part of the detected object in both the first image data and in the second image data.

8. The object temperature regulator system according to claim 1, wherein the processing circuitry is further configured to cause the object temperature regulator system to:
    determine the location of the part of the detected object in relation to the object temperature regulator device based on object recognition processing of the obtained image data and based on location data associated with the location of the object temperature regulator device and the location and/or orientation of the camera sensor.

9. The object temperature regulator system according to claim 1, wherein the object temperature regulator device remains inactive until a part of an object to be cooled or heated is identified for lowering energy consumption of the vehicle.

10. The object temperature regulator system according to claim 1, wherein the processing circuitry is further configured to identify the part of the detected object as a part of a human body and determine if the part of the human body is covered by any garment or if the part of the human body is exposed naked skin, and in accordance with a determination that the part of the human body is exposed naked skin, determine the temperature of the skin of the part of the human body for controlling cooling or heating of the a part of the human body.

11. A method for managing the temperature of a part of an object inside of a vehicle, the method comprising:
    detecting a part of an object inside of the vehicle in image data obtained by at least one camera sensor configured to obtain a graphic image of the part of the object and to obtain a thermographic image of the part of the object for determining a temperature of the part of the object; and
    controlling cooling or heating of the part of the detected object by an object temperature regulator device.

12. The method according to claim 11, the method further comprising:
    identifying the part of the detected object using object recognition processing of the obtained image data.

13. The method according to claim 11, the method further comprising:
    classifying the part of the detected object according to a predefined object category classification data; and
    determining a predefined desired set temperature of the part of the detected object based on the predefined object category classification data.

14. The method according to claim 11, the method further comprising:
    determining the temperature of the part of the detected object.

15. A non-transitory computer readable medium, having stored thereon a computer program comprising program instructions, the computer program being loadable into a processing circuitry and configured to cause execution of the method according to claim 11 when the computer program is run by the processing circuitry.

* * * * *